No. 611,787. Patented Oct. 4, 1898.
P. L. HUSSEY.
BICYCLE WHEEL HUB.
(Application filed Dec. 20, 1897.)
(No Model.)

WITNESSES:
Wm. Voss.
B. McCarty

Patrick L. Hussey,
INVENTOR
By R. J. McCarty
ATTORNEY.

UNITED STATES PATENT OFFICE.

PATRICK L. HUSSEY, OF DAYTON, OHIO.

BICYCLE-WHEEL HUB.

SPECIFICATION forming part of Letters Patent No. 611,787, dated October 4, 1898.

Application filed December 20, 1897. Serial No. 662,536. (No model.)

*To all whom it may concern:*

Be it known that I, PATRICK L. HUSSEY, a citizen of the United States, residing at Dayton, in the county of Montgomery and State of Ohio, have invented certain new and useful Improvements in Bicycle-Wheel Hubs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in wheel-hubs, and more particularly to bicycle-wheel hubs.

The object of the invention is to do away with the annular flanges that are a common feature for the attachment of the spokes and to provide a hub with a greater degree of strength.

In carrying out the objects of my invention I construct the hub in a rounded or spherical form and provide for the attachment of the spokes on opposite sides thereof. This construction gives a greater body of metal to withstand the high tension that is incidental to truing up a rim of any kind, and, further, in the case of a broken spoke it is not necessary with my form of hub to remove the sprocket-wheel in order to replace the spoke.

In a detailed description of the invention reference is made to the accompanying drawings, of which—

Figure 2:
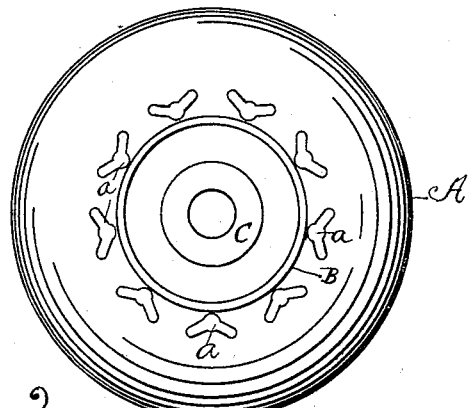
Figure 1:
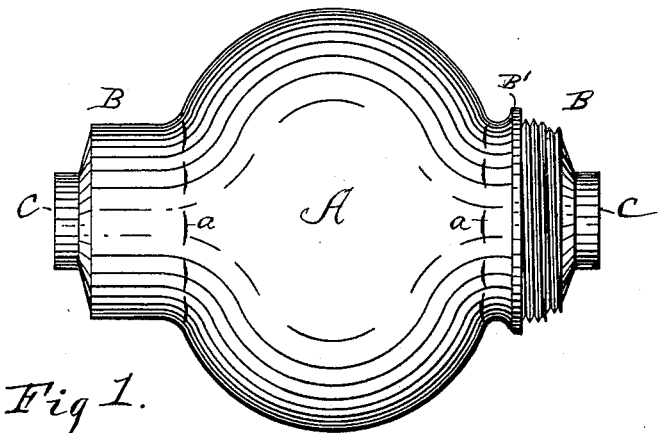

Figure 1 is a side elevation of my improved hub. Fig. 2 is an end elevation.

The hub A is essentially of a spherical form, as shown in Fig. 1, for the purposes of obtaining a hub of a maximum amount of strength. The openings *a a* for the spokes are formed in the rounded portions thereof adjacent to the ends B B. The spokes are attached in these portions of the hub in a manner similar to their attachment to the flanges in the ordinary hub. Hence it has not been thought necessary to illustrate the spokes or any more of the wheel than said hub. The bearing ends B B of the hub are of a substantially smaller diameter than the body or intervening portion, which, as before stated, is essentially of a bulged or spherical form. One of said ends is provided with exterior screw-threads for the attachment of the sprocket-wheel. (Not shown.)

B' is an annular shoulder, against which the sprocket-wheel and nut-lock are tightened in the usual manner.

C C are the outer bearing-cones, which are inclosed in said ends. The hub may be constructed either by stamping it in two longitudinal or transverse halves and welding or brazing said parts together, or by forcing the bulged or spherical form of the hub from a cylindrical tube.

Having described my invention, I claim—

1. A hub for a bicycle-wheel, having its body bulged outwardly and provided with openings for the attachment of the spokes on its opposite sides adjacent to the reduced ends thereof, substantially as and for the purposes specified.

2. A bicycle-hub having its body made in a spherical shape terminating in reduced ends, and openings in the rounded portions of said hub adjacent to the said ends for the attachment of the spokes, as herein shown and described.

In testimony whereof I affix my signature in presence of two witnesses.

PATRICK L. HUSSEY.

Witnesses:
 R. J. MCCARTY,
 W. B. NEVIN.